(12) United States Patent
Guo et al.

(10) Patent No.: US 10,235,568 B2
(45) Date of Patent: Mar. 19, 2019

(54) INDOOR SEMANTIC MAP UPDATING METHOD AND SYSTEM BASED ON SEMANTIC INFORMATION EXTRACTION

(71) Applicant: Deke Guo, Changsha (CN)

(72) Inventors: Deke Guo, Changsha (CN); Xiaoqiang Teng, Changsha (CN); Xiaolei Zhou, Nanjing (CN); Zhong Liu, Changsha (CN)

(73) Assignee: Deke Guo, Changsha (CN)

( * ) Notice: Subject to any disclaimer, the term of this patent is extended or adjusted under 35 U.S.C. 154(b) by 19 days.

(21) Appl. No.: 15/803,778

(22) Filed: Nov. 5, 2017

(65) Prior Publication Data

US 2018/0150693 A1    May 31, 2018

(30) Foreign Application Priority Data

Nov. 25, 2016 (CN) .......................... 2016 1 1054254

(51) Int. Cl.
*G06K 9/00*    (2006.01)
*H04W 4/02*    (2018.01)

(52) U.S. Cl.
CPC ..... *G06K 9/00671* (2013.01); *G06K 9/00744* (2013.01); *G06K 9/00758* (2013.01); *H04W 4/025* (2013.01)

(58) Field of Classification Search
CPC .......... G06K 9/00744; G06K 9/00664; G06K 9/00671; G06K 9/00624; G06K 9/00691; G06K 9/00718; G06K 9/4676; G06K 9/6297; G06K 9/00758; G06T 7/11; G06T 2207/20076; G06T 2210/04; G06T 2210/61; G06T 7/12; G06T 7/143; G06T 7/187; H04W 4/025
See application file for complete search history.

(56) References Cited

U.S. PATENT DOCUMENTS

| | | | |
|---|---|---|---|
| 2014/0113661 A1* | 4/2014 | Yoo ....................... | G01S 5/0252 455/456.3 |
| 2016/0371394 A1* | 12/2016 | Shahidi ................ | H04B 17/318 |
| 2017/0048660 A1* | 2/2017 | Srinivasan .............. | H04W 4/02 |

OTHER PUBLICATIONS

Elhamshary, Moustafa, and Moustafa Youssef. "SemSense: Automatic construction of semantic indoor floorplans." Indoor Positioning and Indoor Navigation (IPIN), 2015 International Conference on. IEEE, 2015. (Year: 2015).*

(Continued)

*Primary Examiner* — Gregory J Tryder
*Assistant Examiner* — Scott E Sonners
(74) *Attorney, Agent, or Firm* — W&K IP

(57) ABSTRACT

The present invention discloses an indoor semantic map updating method and system based on semantic information extraction. The method includes: issuing a crowdsourcing task to all mobile terminals; waiting for any mobile terminal to execute the crowdsourcing task, and receiving a task result thereof; preprocessing the task result to obtain a common key frame sequence; extracting an accurate text sequence from the common key frame sequence; and updating an indoor semantic map according to the common key frame sequence and the accurate text sequence. The present invention can encourage the mobile terminal to execute the crowdsourcing task, and update the indoor semantic map and the text semantic information at a lower cost.

10 Claims, 4 Drawing Sheets

(56) References Cited

OTHER PUBLICATIONS

Wang, Bang, et al. "Indoor smartphone localization via fingerprint crowdsourcing: Challenges and approaches." IEEE Wireless Communications 23.3 (2016): 82-89. (Year: 2016).*

Subbu, Kalyan, et al. "Analysis and status quo of smartphone-based indoor localization systems." IEEE Wireless Commun. 21.4 (2014): 106-112. (Year: 2014).*

Mörwald, Thomas, et al. "Blort-the blocks world robotic vision toolbox." Proc. ICRA Workshop Best Practice in 3D Perception and Modeling for Mobile Manipulation. 2010. (Year: 2010).*

Pronobis, Andrzej, and Patric Jensfelt, "Large-scale semantic mapping and reasoning with heterogeneous modalities." Robotics and Automation (ICRA), 2012 IEEE International Conference on. IEEE, 2012. (Year: 2012).*

* cited by examiner

INDOOR SEMANTIC MAP UPDATING METHOD AND SYSTEM BASED ON SEMANTIC INFORMATION EXTRACTION

CROSS-REFERENCE TO RELATED APPLICATIONS

This application claims priority to Chinese Patent Application No. 201611054254.7 with a filing date of Nov. 25, 2016. The content of the aforementioned application, including any intervening amendments thereto, are incorporated herein by reference.

TECHNICAL FIELD

The present invention relates to indoor localization technology, and in particular, to an indoor semantic map updating method and system based on semantic information extraction.

BACKGROUND OF THE PRESENT INVENTION

In recent years, indoor localization technology has been applied in the indoor navigation, social networks, advertisement pushing and other services. One of the necessary conditions for operation of an indoor location based service (LBS) system is the availability of an indoor map, so the automatic construction of the indoor map has become a main problem of the current LBS service. Many researchers use crowdsourced data (such as images, WiFi signal strength, motion trajectories of users and the like) to construct indoor two-dimensional plane maps. However, the two-dimensional plane maps constructed by these systems do not have semantic information of indoor spaces.

The emergence of an indoor semantic map can improve operation of the existing indoor LBS systems, and the indoor semantic map can also be used for designing new indoor LBS systems. The indoor semantic map records the spatial structure of an indoor object and its semantics (such as names, categories, functions and other non-spatial attributes), and each indoor space object have rich semantic information. Such indoor space objects refer to general entities at any locations and regions, including annotated entities and non-annotated entities. An annotated entity indicates that its semantic information has been labeled with text information, for example, the name and the functional attribute of the indoor object in a commercial place have been labeled with the text information. A non-annotated entity, for example, a fine-grained general entity, refers to an entity that lacks labeled text information.

Although the text information of each annotated entity can provide accurate semantic information for the automatic construction of the indoor semantic map, the method in the prior art mainly focuses on the recognition and classification of specific indoor entities, and such semantic text information cannot be accurately recognized. Furthermore, the semantic information of the indoor space is dynamically changing, for example, the change of stores in a mall, the update of the marketing information of the mall, and the change of exhibits. For a given indoor space, the semantic information already labeled on the map is obviously different from the current indoor semantic information. If the newly updated semantic information is not labeled in time or the out-of-date semantic information is not removed in time, the initial indoor semantic map can be gradually deteriorated or even break down the performance of the LBS system. In this case, the indoor semantic map not only can not improve the experience of the existing indoor LBS, but also cannot produce a new indoor LBS system. Therefore, the problem of adaptation and update of the indoor semantic map has not been solved. This open problem basically limits the application of the indoor semantic map, especially long-term deployment application.

A straightforward approach to solve this problem is to periodically regenerate the entire indoor semantic map. This method is time-consuming and laborious, and a lot of resources are wasted for updating the unchanged indoor environment. The method is designed to automatically construct the entire indoor plane map, is not suitable for real-time updating of clear semantic information of a complex indoor space. Moreover, it cannot update the text semantic information, so the update of the annotated entity will be invalid.

There is no effective solution to the problems that the cost of the method for updating the indoor semantic map in the prior art is too high, and that the text information cannot be updated.

SUMMARY OF PRESENT INVENTION

In view of this, the objective of the present invention is to provide an indoor semantic map updating method based on semantic information extraction, capable of updating an indoor semantic map and text semantic information at a lower cost.

According to one aspect of the present invention, an indoor semantic map updating method based on semantic information extraction is provided.

The indoor semantic map updating method based on semantic information extraction provided according to the present invention includes:
 issuing a crowdsourcing task to all mobile terminals;
 waiting for any mobile terminal to execute the crowdsourcing task, and receiving a task result thereof;
 preprocessing the task result to obtain a common key frame sequence;
 extracting an accurate text sequence from the common key frame sequence; and
 updating an indoor semantic map according to the common key frame sequence and the accurate text sequence.

The crowdsourcing task includes a position acquisition task and a short video collection task, wherein the position acquisition task is to acquire a geographic position where the mobile terminal is located according to GPS positioning, and the short video collection task is to photograph an indoor object containing rich semantics; and preprocessing the task result to obtain a common key frame sequence includes: preprocessing a short video collected by the short video collection task, and extracting the common key frame sequence.

Moreover, preprocessing a short video collected by the short video collection task, and extracting the common key frame sequence includes:
 extracting all key frames from the short video, and including all key frames into a plurality of key frame sequences; and
 extracting a common part from the plurality of key frame sequences to obtain the common key frame sequence.

Moreover, extracting all key frames from the short video includes: removing all images having similar heights with other images from the short video by using a key frame algorithm, the remaining images being deemed as the key frames.

Furthermore, extracting a common part from the plurality of key frame sequences to obtain the common key frame sequence includes:

specifying one of the plurality of key frame sequences as a seed sequence;

additionally selecting an unlabeled sequence from the plurality of key frame sequences, and calculating a sequence distance between the seed sequence and the additionally selected sequence and a length difference of the two sequences;

calculating a longest common sub-sequence of the seed sequence and the additionally selected sequence according to the sequence distance between the seed sequence and the additionally selected sequence and the length difference of the two sequences;

calculating a similarity score of the two sequences according to the longest common sub-sequence of the seed sequence and the additionally selected sequence, and determining whether the two sequences are similar according to the similarity score;

judging whether the length of the longest common sub-sequence of the seed sequence and the additionally selected sequence reaches more than half of the length of the additionally selected sequence, if so, marking the additionally selected sequence, and otherwise, not marking the additionally selected sequence; and reselecting another unlabeled sequence from the plurality of key frame sequences, and sequentially executing the above operations until all sequences in the plurality of key frame sequences are labeled.

In addition, extracting an accurate text sequence from the common key frame sequence includes:

recognizing text from the common key frame sequence, and including all recognized text into a plurality of text sequences; and extracting the accurate text sequence from the plurality of text sequences by using a Markov random field.

Moreover, extracting the accurate text sequence from the plurality of text sequences by using a Markov random field includes:

obtaining each hidden state node and an observation node corresponding thereto in the plurality of text sequences;

obtaining a probability function between every two hidden state neighbor nodes and the probability function between each hidden state node and the observation node corresponding thereto according to each hidden state node and the observation node corresponding thereto in the plurality of text sequences;

obtaining a joint probability of the plurality of text sequences according to the probability function between every two hidden state neighbor nodes and the probability function between each hidden state node and the observation node corresponding thereto;

obtaining optimal estimation of any node by using a maximum likelihood estimation method on the joint probability of the plurality of text sequences;

obtaining information between any two nodes according to the optimal estimation and reliability of the node; and extracting the accurate text sequence according to the information between any two nodes.

In addition, updating an indoor semantic map according to the common key frame sequence and the accurate text sequence includes:

extracting an image feature from the common key frame sequence;

extracting an unchanged text score and an unchanged text set from the accurate text sequence;

separately calculating a room contour energy term, an unchanged text energy term and an unchanged neighbor text energy term according to the image feature, the unchanged text score, the unchanged text set and a preset weight;

calculating a total energy term according to the room contour energy term, the unchanged text energy term and the unchanged neighbor text energy term; and positioning the accurate text sequence onto the indoor semantic map by using the total energy term, and updating the indoor semantic map.

Moreover, positioning the accurate text sequence onto the indoor semantic map by using the total energy term includes:

specifying each text sequence successively;

calculating a sequence distance between the specified text sequence and an indoor semantic map overall sequence and a length difference of the two sequences;

calculating a longest common sub-sequence of the specified text sequence and the indoor semantic map overall sequence according to the sequence distance between the specified text sequence and the indoor semantic map overall sequence and the length difference of the two sequences;

calculating a similarity score of the specified text sequence and the indoor semantic map overall sequence according to the longest common sub-sequence of the two sequences; and after each text sequence is traversed, positioning the text sequence having the highest similarity score onto the indoor semantic map.

According to another aspect of the present invention, an indoor semantic map updating system based on semantic information extraction is provided.

The indoor semantic map updating system based on semantic information extraction provided according to the present invention adopts any indoor semantic map updating method mentioned above.

As can be seen from the above, the technical solution provided by the present invention can encourage the mobile terminal to execute the crowdsourcing task by adopting the technical means of issuing the crowdsourcing task, receiving the task result thereof, preprocessing the task result to obtain the common key frame sequence, extracting the accurate text sequence and updating the indoor semantic map, and the indoor semantic map and the text semantic information are updated at a lower cost.

DESCRIPTION OF THE DRAWINGS

To illustrate technical solutions in the embodiments of the present invention or in the prior art more clearly, a brief introduction on the accompanying drawings which are needed in the description of the embodiments is given below. Apparently, the accompanying drawings in the description below are merely some of the embodiments of the present invention, based on which other accompanying drawings can be obtained by those of ordinary skill in the art without any creative effort.

DETAILED DESCRIPTION OF PREFERRED EMBODIMENTS

In order that the objectives, technical solutions and advantages of the present invention are clearer, a clear, complete and detailed description of technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skill in the art based on the embodiments of the present invention, fall into the protection scope of the present invention.

According to an embodiment of the present invention, an indoor semantic map updating method based on semantic information extraction is provided.

Figure 1:
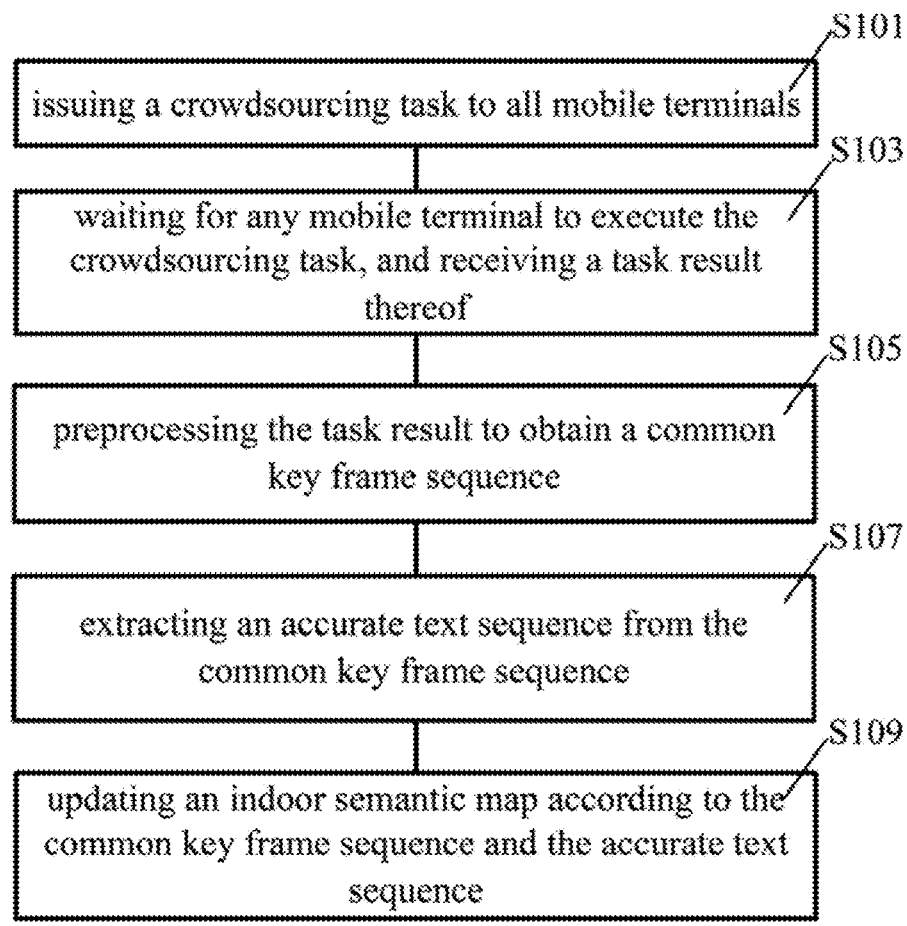
FIG. 1 is a flowchart of an indoor semantic map updating method based on semantic information extraction according to an embodiment of the present invention.

As shown in FIG. 1, the indoor semantic map updating method based on semantic information extraction provided according to the embodiment of the present invention includes:

step S101, issuing a crowdsourcing task to all mobile terminals;

step S103, waiting for any mobile terminal to execute the crowdsourcing task, and receiving a task result thereof;

step S105, preprocessing the task result to obtain a common key frame sequence;

step S107, extracting an accurate text sequence from the common key frame sequence; and step S109, updating an indoor semantic map according to the common key frame sequence and the accurate text sequence.

The crowdsourcing task includes a position acquisition task and a short video collection task, wherein the position acquisition task is to acquire a geographic position where the mobile terminal is located according to GPS positioning, and the short video collection task is to photograph an indoor object containing rich semantics; and preprocessing the task result to obtain a common key frame sequence includes: preprocessing a short video collected by the short video collection task, and extracting the common key frame sequence.

Moreover, preprocessing a short video collected by the short video collection task, and extracting the common key frame sequence includes:

extracting all key frames from the short video, and including all key frames into a plurality of key frame sequences; and extracting a common part from the plurality of key frame sequences to obtain the common key frame sequence.

Moreover, extracting all key frames from the short video includes: removing all images having similar heights with other images from the short video by using a key frame algorithm, the remaining images being deemed as the key frames.

Furthermore, extracting a common part from the plurality of key frame sequences to obtain the common key frame sequence includes:

specifying one of the plurality of key frame sequences as a seed sequence;

additionally selecting an unlabeled sequence from the plurality of key frame sequences, and calculating a sequence distance between the seed sequence and the additionally selected sequence and a length difference of the two sequences;

calculating a longest common sub-sequence of the seed sequence and the additionally selected sequence according to the sequence distance between the seed sequence and the additionally selected sequence and the length difference of the two sequences;

calculating a similarity score of the two sequences according to the longest common sub-sequence of the seed sequence and the additionally selected sequence, and determining whether the two sequences are similar according to the similarity score;

judging whether the length of the longest common sub-sequence of the seed sequence and the additionally selected sequence reaches more than half of the length of the additionally selected sequence, if so, marking the additionally selected sequence, and otherwise, not marking the additionally selected sequence; and reselecting another unlabeled sequence from the plurality of key frame sequences, and sequentially executing the above operations until all sequences in the plurality of key frame sequences are labeled.

In addition, extracting an accurate text sequence from the common key frame sequence includes:

recognizing text from the common key frame sequence, and including all recognized text into a plurality of text sequences; and extracting the accurate text sequence from the plurality of text sequences by using a Markov random field.

Moreover, extracting the accurate text sequence from the plurality of text sequences by using a Markov random field includes:

obtaining each hidden state node and an observation node corresponding thereto in the plurality of text sequences;

obtaining a probability function between every two hidden state neighbor nodes and the probability function between each hidden state node and the observation node corresponding thereto according to each hidden state node and the observation node corresponding thereto in the plurality of text sequences;

obtaining a joint probability of the plurality of text sequences according to the probability function between every two hidden state neighbor nodes and the probability function between each hidden state node and the observation node corresponding thereto;

obtaining optimal estimation of any node by using a maximum likelihood estimation method on the joint probability of the plurality of text sequences;

obtaining information between any two nodes according to the optimal estimation and reliability of the node; and extracting the accurate text sequence according to the information between any two nodes.

In addition, updating an indoor semantic map according to the common key frame sequence and the accurate text sequence includes:

extracting an image feature from the common key frame sequence;

extracting an unchanged text score and an unchanged text set from the accurate text sequence;

separately calculating a room contour energy term, an unchanged text energy term and an unchanged neighbor text energy term according to the image feature, the unchanged text score, the unchanged text set and a preset weight;

calculating a total energy term according to the room contour energy term, the unchanged text energy term and the unchanged neighbor text energy term; and positioning the accurate text sequence onto the indoor semantic map by using the total energy term, and updating the indoor semantic map.

Moreover, positioning the accurate text sequence onto the indoor semantic map by using the total energy term includes:

specifying each text sequence successively;

calculating a sequence distance between the specified text sequence and an indoor semantic map overall sequence and a length difference of the two sequences;

calculating a longest common sub-sequence of the specified text sequence and the indoor semantic map overall sequence according to the sequence distance between the specified text sequence and the indoor semantic map overall sequence and the length difference of the two sequences;

calculating a similarity score of the specified text sequence and the indoor semantic map overall sequence according to the longest common sub-sequence of the two sequences; and after each text sequence is traversed, positioning the text sequence having the highest similarity score onto the indoor semantic map.

According to another embodiment of the present invention, an indoor semantic map updating system based on user feedback is provided, and the indoor semantic map updating system adopts the indoor semantic map updating method mentioned above.

The technical solution of the present invention is further illustrated according to the specific embodiment.

In the embodiment of the present invention, an automatic and continuous indoor semantic map updating system, named as SiFi, is designed by using short videos containing rich semantics. The short videos containing rich semantics provide semantic information of an indoor object, and are easy to capture and share by the mobile terminal. The mobile terminal initiatively captures the indoor short videos and uploads the same to a server to be further processed. The SiFi system extracts images and semantic sequences from the short videos and establishes sequence relations between the images and between text. Compared with the disordered images and text, the SiFi system illustrates that the ordered images and text provide more valuable information under the same data size, and these extracted text sequences are matched with the current indoor semantic map to update the changed semantic information. Therefore, the indoor semantic map can be updated in real time to maintain the long-term deployment of the indoor location service system without depending on any indoor localization system or additional hardware facilities.

Figure 2:
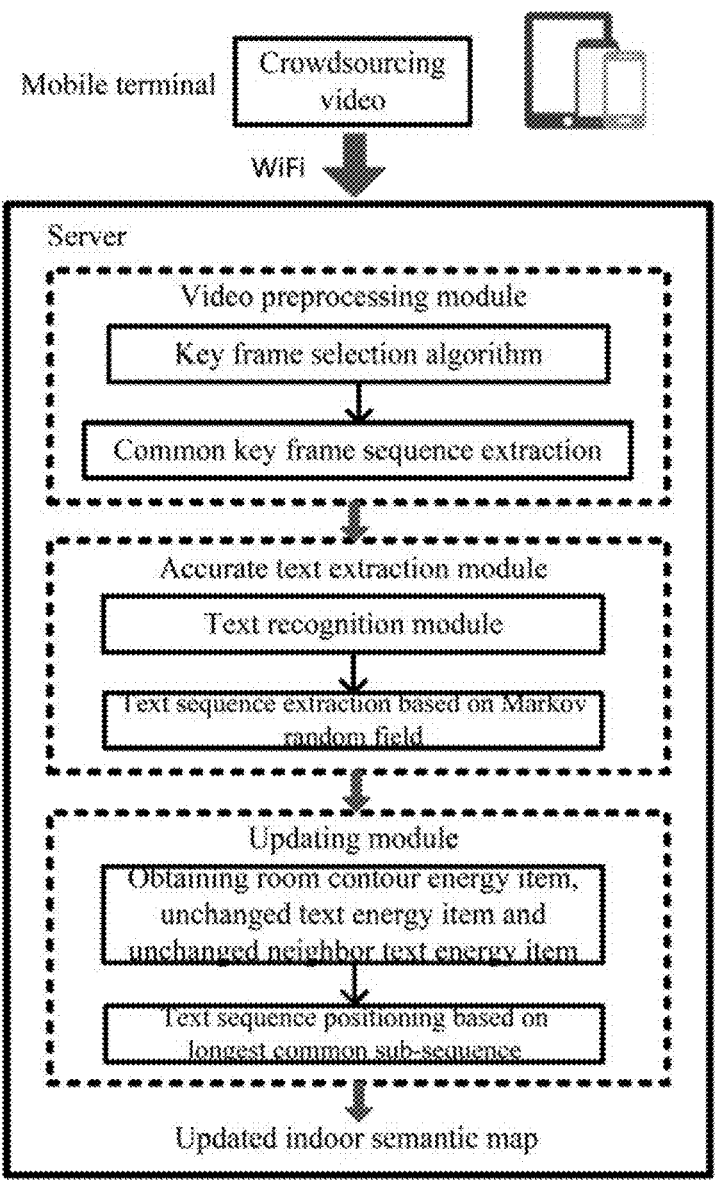
FIG. 2 is a structure diagram of an indoor semantic map updating system based on semantic information extraction according to an embodiment of the present invention.

The structure diagram of the indoor semantic map system is shown in FIG. 2. In order to collect the short videos containing rich semantics, the server firstly distributes two crowdsourcing tasks, and a user executes the crowdsourcing tasks to capture the video of an indoor space, and uploads the video to the server through a WiFi network for further processing.

Most of the video processing load of the system is placed on the server. The server-side processing part includes video preprocessing, accurate text extraction and updating. The short videos containing rich semantics captured by different users, different devices, different use attitudes, different camera positions and different view angles obviously have significant differences; and on the other hand, the motion trajectories of the cameras are not determined. Under the influence of the two factors, it is very difficult for the server to process the videos. Therefore, the short videos containing rich semantics are firstly loaded to a video preprocessing module of the server, the video preprocessing module extracts the common key frame sequence from the short videos containing rich semantics, and a text extraction module extracts the accurate text sequence from the common key frame sequence. In the embodiment of the invention, the accurate text extraction process is modeled as a Markov random field process. After the accurate text sequence is obtained, the server positions the text sequence on the indoor semantic map by using three energy items (a room contour, an unchanged text, and an unchanged neighbor text) to obtain the position of the changed semantic information and update the changed text semantics. The updated indoor semantic map can be used for serving the indoor LBS system.

In the prior art, a text recognition algorithm in the field of computer vision has false positive and false negative errors, and cannot be directly applied to the SiFi system due to very low text recognition precision. In the embodiment of the present invention, video preprocessing is performed before accurate text extraction.

Because the videos are collected in a crowdsourcing mode, there is a significant difference among the videos, and thus the video preprocessing needs to be executed at first.

Firstly, when two frames of images are matched by using the SURF (Speed Up Robust Features) algorithm, the processing of video data is a bottleneck restricting the operation of the SiFi system. The known fact is that the two adjacent frames of images in the video have high similarity, while the two non-adjacent frames of images have significant distinguishability. Thus, in the embodiment of the present invention, a key frame extraction algorithm is used for removing similar images in the videos, and the remaining images are called key frames. In the embodiment of the present invention, $I_1$ represents the key frame, and $I=(I_1, I_2, \ldots, I_m)$ represents a key frame sequence.

When a plurality of key frame sequences are obtained, the LSE (longest common subsequence) method is used in the embodiment of the present invention to calculate the similarity between two key frames and extract their common part. Furthermore, $I_a$ and $I_b$ represent two key frame sequences, whose lengths are m and n respectively. The LCS matrix is calculated by using the following formula:

$$L(I_{a,m}, I_{b,n}) = \begin{cases} o, \text{ if } m=0 \text{ or } n=0, \\ 1 + L(I_{a,m-1}, I_{b,n-1}), \text{ if } d(I_{a,m}, I_{b,n}) \le \epsilon \text{ and } |m-n| \le \delta, \\ \max(L(I_{a,m}, I_{b,n-1}), L(I_{a,m-1}, I_{b,n})), \text{ otherwise} \end{cases}$$

Wherein $\delta$ represents a length difference threshold of the two key frame sequences, $\epsilon$ represents a distance threshold, and d represents a similarity calculation value of the two key frame sequences.

The similarity score $S_I$ is defined as:

$$S_I = \max_{f \in F} \frac{L(I_a, f(I_b))}{\min(m, n)}$$

wherein F represents all sliding windows. If $S_I$ is higher than the threshold $S_{I'}$, then the two key frame sequences are deemed to be similar.

In the embodiment of the present invention, the common part of the plurality of key frames is calculated by the following method: specifying that a key frame sequence is selected as a seed sequence (seed), and obtaining the common part of the seed and the second key frame sequence (second sequence) by using the LCS method. If the common part is more than half of the length of the second key frame sequence, then the second key frame sequence is loaded to a set having the common part, and otherwise, the second key frame sequence is loaded to a non-common part set. Then, different second key frame sequences are continuously selected from the non-common part set to repeat the above operation until the non-common part set is empty.

As the precision of the vision-based text recognition algorithm is not high enough, it cannot be directly applied to the SiFi system. The low precision of the algorithm will produce two types of errors, false positive errors and false negative errors, the false positive errors refer to misrecognition of text (non-text is recognized as text), the false negative error refers to the missing recognition of text (text is not recognized as text). These errors make it difficult to directly obtain the accurate text information to update the indoor semantic map.

In order to obtain the accurate text information, a layered method is designed in the embodiment of the present invention. Firstly, the text is primarily recognized by using the existing computer vision algorithm; and then the text sequence is obtained from the key frame sequence. In the embodiment of the present invention, tx represents a piece of text, and TX={$tx_1$, $tx_2$, $tx_k$} represents the text sequence. The accurate text is extracted from a plurality of text sequences by using the Markov random field.

Figure 3:
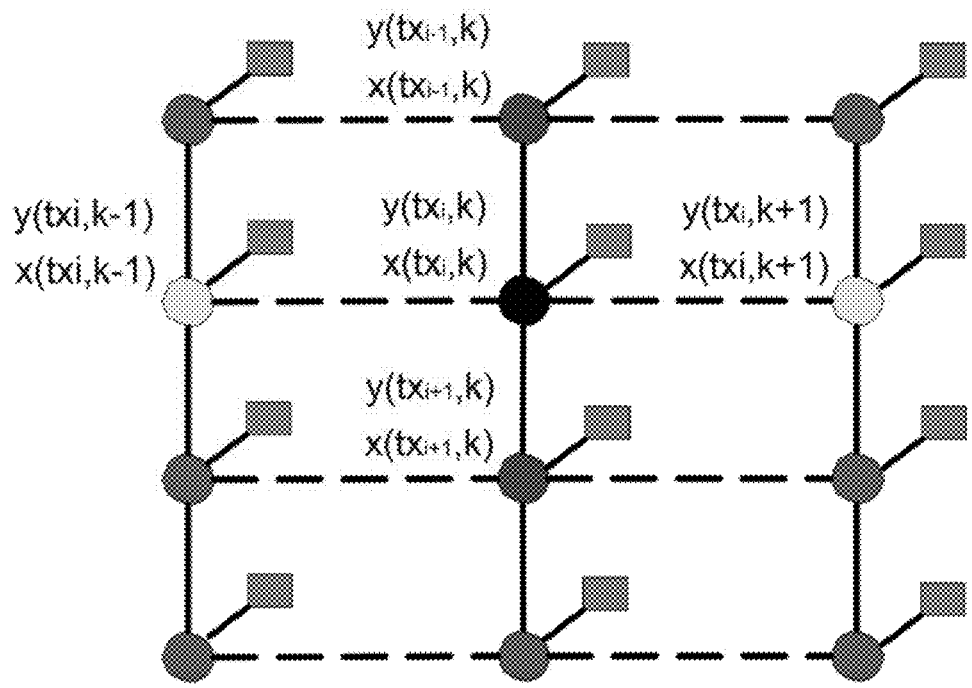
FIG. 3 is an undirected graph model of a Markov random field in the indoor semantic map updating system based on semantic information extraction according to the embodiment of the present invention.

FIG. 3 shows an undirected graph model of the Markov random field. The Markov random field expresses the joint probability of two random variables. In the Markov random field, and a piece of text $tx_i$ has a hidden state node $x(tx_i,k)$ (circular) and an observation node $y(tx_i,k)$ (square) in the $k^{th}$ text sequence. In the same text sequence, $x(tx_i,k)$ has two neighbor nodes $x(tx_{i+1},k)$ and $x(tx_{i-1},k)$. In different text sequences, $x(tx_i,k)$ has two neighbor nodes $x(tx_i,k-1)$ and $x(tx_i,k+1)$. The joint probability of random variables $x_1, x_2, \ldots, x_N, y_1, y_2, \ldots, y_N$ (defined as X, Y) is defined as:

$$p(X, Y) = \frac{1}{Z} \prod_{i \neq j} \psi_{ij}(x_i, x_j) \prod_k \phi_k(x_k, y_k)$$

Wherein $\psi$ represents a probability function between neighbor nodes, $\phi$ represents the probability function between the state node and the observation node, N represents the amount of text, and Z represents a normalization parameter. Further, MLE (Maximum Likelihood Estimation) is used for obtaining the optimal estimation of $x_j$:

$$x_j^* = \sum_{x_j} x_i \sum_{x_i, i \neq j} p(X, Y)$$

In the embodiment of the invention, the Markov random field model is solved by using a reliability propagation algorithm. $b(x_j)$ represents the reliability of the node $x_j$, $m_{kj}(x)$ represents the message between the node k and the node j, and then the MLE message is expressed as:

$$x_j^* = \sum_{x_j} x_j b(x_j)$$

The equation is reorganized to obtain:

$$m_{kj}(x_j) = \sum_{x_k} \psi_{jk}(x_j, x_k) \phi_k(x_k, x_k) \prod_{i \in N(k) \setminus j} m_{ik}$$

wherein $i \in N(k) \setminus j$ represents all neighbor nodes of $x_i$ excluding $x_j$.

In addition, the observation node $y(tx_i)$ represents the change probability of the $i^{th}$ node. If $y(tx_i)=0$, then it is deemed that the is node has no change. It is assumed that the uniform distribution on [1,M] is abided by initially, wherein M represents the amount of the text. If $y(tx_i)=1$, then it is deemed that the $i^{th}$ node has a change. The changed text is set as $\xi(x_i=f(i)$, wherein $f(i)$ is a counting function defined as $f(i)=tx(\max\{N(tx_1), N(tx_2), \ldots, N(tx_M)\})$, wherein $N(tx_i)$ represents the amount of the $i^{th}$ text, and tx(N) represents the text in the amount N. Then $$\phi_i(x_i, y_i) = \begin{cases} \frac{1}{M}, & y(x_i) = 0; \\ \xi(x_i = f(i)), & y(x_i) = 1 \end{cases}.$$

In addition, $\psi$ is replaced by a Potts model:

$$\psi_{ij}(x_i^{P_g}, x_j^{P_n}) = \begin{cases} p, & P_g = P_h; \\ q, & \text{otherwise} \end{cases}.$$

wherein $x_i^{P_g}$ and $x_j^{P_h}$ respectively represent the $P_g^{th}$ text for the node $x_i$ and the $P_g^{th}$ text for the node $x_j$, $0 < p < 1$, $$q = \frac{1-p}{M-1},$$

p»q. If the text has no change, then the subsequent text sequence will reduce. P represents an attenuation index and expresses the difference between two neighbor nodes.

After the text sequence is obtained, in the embodiment of the invention, the function relationship between the text sequence and the indoor semantic map is found at first. The changed text semantic information is positioned and updated on the indoor semantic map. Firstly, the text uses a tuple $Z(X, Y)=\{(x,y)|(x,y) \in R^2\}$ on the indoor semantic map, wherein (x, y) represents a position coordinate of a piece of text on the indoor semantic map. Therefore, we obtain the function relationship U:

$$Z(X,Y)=U(I,TX,M)$$

wherein I represents any image sequence, TX represents a text sequence corresponding thereto, and M represents the updated indoor semantic map.

In the embodiment of the present invention, three energy items are modeled to describe the probability, including the room contour, the unchanged text and the text where the neighbor has no change. In view of a very complex indoor environment, while the areas on the plane map are mostly non-convex, we use two-tuple $Q=\{q_i, s_i\}$ for expression, wherein qt represents a parallelogram and $s_i$ represents the corresponding text.

In the embodiment of the present invention, the room contour energy item is modeled as:

$$E_{facade} = \sum_{i \in Q} w_i^T \Psi_{om+gc}(qi)$$

wherein $\Psi_{om+gc}(q_i)$ represents the image feature, and $w_i^T$ represents the weight.

In the embodiment of the present invention, the unchanged text energy item is modeled as:

$$E_{UT} = -w_{UT} \sum_{b \in B} f_{UT}(b)$$

wherein $f_{UT}$ represents the score of the unchanged text, b represents a set of the unchanged text boxes, and $-w_{UT}$ represents the weight.

In the embodiment of the present invention, the unchanged neighbor text energy item is modeled as:

$$E_{NUT} = -w_{NUT} \Pi E_{UT}$$

wherein $-w_{NUT}$ represents the weight.

Finally, we obtain an overall energy item, which is defined as:

$$E = E_{facade} + E_{UT} + E_{NUT}$$

wherein the room contour energy item is calculated by using the key frame sequence, and the unchanged text and the unchanged neighbor text are calculated by using the text sequence. The weights are adaptively adjusted according to the key frame and the text sequence. Next, we use the overall energy term to position the text sequence on the indoor semantic map.

A text sequence ($TX_a$) with a length n and a corresponding key frame sequence I are given, and the LCS method is used in the embodiment of the present invention to match $TX_a$ and I on the whole indoor semantic map. The whole indoor semantic map is deemed as a text sequence $TX_b$ with a length M, and an LCS matrix of $TX_a$ and $TX_b$ is:

$$L(TX_{a,n}, TX_{b,m}) = \begin{cases} 0, & \text{if } m = 0 \text{ or } n = 0, \\ 1 + L(TX_{a,n-1}, TX_{b,m-1}), & \text{if } d(TX_{a,n}, TX_{b,n}) \le \epsilon \text{ and } |m - n| \le \delta, \\ \max(L(TX_{a,n}, TX_{b,m-1}), L(TX_{a,n-1}, TX_{b,m})), & \text{otherwise} \end{cases}$$

wherein $\delta$ represent the maximum distance difference threshold of the two text sequences, and $\epsilon$ represent the energy threshold.

The similarity score is calculated as follows:

$$S_{TX} = \max_{f \in F} \frac{L(TX_a, f(TX_b))}{\min(m, n)}$$

wherein F represents all sliding windows. On the indoor semantic map, the text sequence having the maximum value S_TX is selected as a result value, and the coordinate of each corresponding text can also be obtained.

Figure 4:
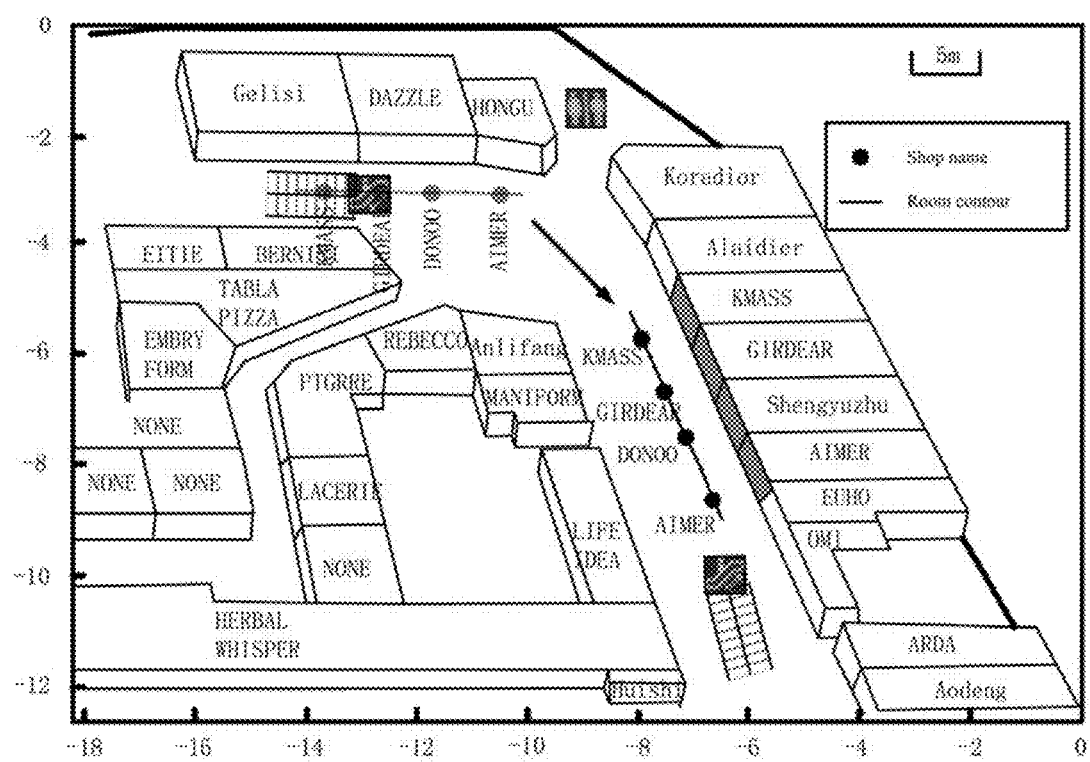
FIG. 4 is an embodiment of updating an indoor semantic map in the indoor semantic map updating system based on semantic information extraction according to the embodiment of the present invention.

So far, the indoor semantic map is updated by using the newly measured image and text sequences in the embodiment of the present invention updates, and the indoor semantic map is updated to adapt to the dynamic change of the indoor environment, as shown in FIG. 4.

In summary, by means of the technical solution of the present invention mentioned above, the mobile terminal can be encouraged to execute the crowdsourcing task by the technical means of issuing the crowdsourcing task, receiving the task result thereof, preprocessing the task result to obtain the common key frame sequence, extracting the accurate text sequence and updating the indoor semantic map, and the indoor semantic map and the text semantic information are updated at a lower cost.

It should be understood by those of ordinary skill in the art that described above are merely specific embodiments of the present invention, which are not intended to limit the present invention, and that any modifications, equivalent substitutions, improvements and the like made within the spirit and principle of the present invention shall all be encompassed within the protection scope of the present invention.

We claim:

1. An indoor semantic map updating method based on semantic information extraction, comprising:

issuing a crowdsourcing task to all mobile terminals, wherein the crowdsourcing task comprises a position acquisition task and a short video collection task, the position acquisition task is to acquire a geographic position where the mobile terminal is located according to GPS positioning, and the short video collection task is to photograph an indoor object containing rich semantics;

waiting for any mobile terminal to execute the crowdsourcing task, and receiving a task result thereof;

preprocessing a short video collected by the short video collection task, and extracting a common key frame sequence, which specifically comprises: extracting all key frames from the short video, and including all key frames into a plurality of key frame sequences; and extracting a common part from the plurality of key frame sequences to obtain the common key frame sequence;

extracting an accurate text sequence from the common key frame sequence, which specifically comprises: recognizing text from the common key frame sequence, and including all recognized text into a plurality of text sequences; and extracting the accurate text sequence from the plurality of text sequences by using a Markov random field; and updating an indoor semantic map according to the common key frame sequence and the accurate text sequence, which specifically comprises: extracting an image feature from the common key frame sequence; extracting an unchanged text score and an unchanged text set from the accurate text sequence; separately calculating a room contour energy term, an unchanged text energy term and an unchanged neighbor text energy term according to the image feature, the unchanged text score, the unchanged text set and a preset weight; calculating a total energy term according to the room contour energy term, the unchanged text energy term and the unchanged neighbor text energy term; and positioning the accurate text sequence onto the indoor semantic map by using the total energy term, and updating the indoor semantic map.

2. The method of claim 1, wherein extracting all key frames from the short video comprises: removing all images having similar heights with other images from the short video by using a key frame algorithm, the remaining images being deemed as the key frames.

3. The method of claim 1, wherein extracting a common part from the plurality of key frame sequences to obtain the common key frame sequence comprises:
- specifying one of the plurality of key frame sequences as a seed sequence;
- additionally selecting an unlabeled sequence from the plurality of key frame sequences, and calculating a sequence distance between the seed sequence and the additionally selected sequence and a length difference of the two sequences;
- calculating a longest common sub-sequence of the seed sequence and the additionally selected sequence according to the sequence distance between the seed sequence and the additionally selected sequence and the length difference of the two sequences;
- calculating a similarity score of the two sequences according to the longest common sub-sequence of the seed sequence and the additionally selected sequence, and determining whether the two sequences are similar according to the similarity score;
- judging whether the length of the longest common sub-sequence of the seed sequence and the additionally selected sequence reaches more than half of the length of the additionally selected sequence, if so, marking the additionally selected sequence, and otherwise, not marking the additionally selected sequence; and
- reselecting another unlabeled sequence from the plurality of key frame sequences, and sequentially executing the above operations until all sequences in the plurality of key frame sequences are labeled.

4. The method of claim 1, wherein extracting the accurate text sequence from the plurality of text sequences by using a Markov random field comprises:
- obtaining each hidden state node and an observation node corresponding thereto in the plurality of text sequences;
- obtaining a probability function between every two hidden state neighbor nodes and the probability function between each hidden state node and the observation node corresponding thereto according to each hidden state node and the observation node corresponding thereto in the plurality of text sequences;
- obtaining a joint probability of the plurality of text sequences according to the probability function between every two hidden state neighbor nodes and the probability function between each hidden state node and the observation node corresponding thereto;
- obtaining optimal estimation of any node by using a maximum likelihood estimation method on the joint probability of the plurality of text sequences;
- obtaining information between any two nodes according to the optimal estimation and reliability of the node; and
- extracting the accurate text sequence according to the information between any two nodes.

5. The method of claim 1, wherein positioning the accurate text sequence onto the indoor semantic map by using the total energy term comprises:
- specifying each text sequence successively;
- calculating a sequence distance between the specified text sequence and an indoor semantic map overall sequence and a length difference of the two sequences;
- calculating a longest common sub-sequence of the specified text sequence and the indoor semantic map overall sequence according to the sequence distance between the specified text sequence and the indoor semantic map overall sequence and the length difference of the two sequences;
- calculating a similarity score of the specified text sequence and the indoor semantic map overall sequence according to the longest common sub-sequence of the two sequences; and
- after each text sequence is traversed, positioning the text sequence having the highest similarity score onto the indoor semantic map.

6. An indoor semantic map updating system based on semantic information extraction, wherein the indoor semantic map updating method of claim 1 is used.

7. An indoor semantic map updating system based on semantic information extraction, wherein the indoor semantic map updating method of claim 2 is used.

8. An indoor semantic map updating system based on semantic information extraction, wherein the indoor semantic map updating method of claim 3 is used.

9. An indoor semantic map updating system based on semantic information extraction, wherein the indoor semantic map updating method of claim 4 is used.

10. An indoor semantic map updating system based on semantic information extraction, wherein the indoor semantic map updating method of claim 5 is used.

* * * * *